(12) United States Patent
Ishii

(10) Patent No.: US 9,427,931 B2
(45) Date of Patent: Aug. 30, 2016

(54) PRODUCTION APPARATUS OF SKIN-FITTED FOAM MOLDING MEMBER, PRODUCTION METHOD OF SKIN-FITTED FOAM MOLDING MEMBER, AND SKIN-FITTED FOAM MOLDING MEMBER

(71) Applicant: NISSAN MOTOR CO., LTD., Yokohama-shi, Kanagawa-ken (JP)

(72) Inventor: Kaoru Ishii, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 370 days.

(21) Appl. No.: 13/873,806

(22) Filed: Apr. 30, 2013

(65) Prior Publication Data

US 2013/0236682 A1 Sep. 12, 2013

Related U.S. Application Data

(62) Division of application No. 13/132,445, filed as application No. PCT/JP2009/067997 on Oct. 19, 2009.

(30) Foreign Application Priority Data

Dec. 3, 2008 (JP) ................................. 2008-309028

(51) Int. Cl.
*B32B 3/04* (2006.01)
*B29C 44/12* (2006.01)
(Continued)

(52) U.S. Cl.
CPC ............. *B32B 3/04* (2013.01); *B29C 44/1257* (2013.01); *B29C 44/146* (2013.01); *B32B 5/18* (2013.01); *B32B 7/04* (2013.01); *Y10T 156/1002* (2015.01); *Y10T 428/233* (2015.01)

(58) Field of Classification Search
CPC ... B29C 44/1257; B29C 44/146; B32B 3/04; B32B 5/18; B32B 7/04; Y10T 156/1002; Y10T 428/233; Y10T 428/29
USPC ......................................................... 428/57
See application file for complete search history.

(56) References Cited

U.S. PATENT DOCUMENTS

2006/0208539 A1 9/2006 Ludwig et al.
2007/0216056 A1* 9/2007 Hanada ........................ 264/45.1

FOREIGN PATENT DOCUMENTS

CN 1597294 A 3/2005
CN 1785646 A 6/2006
(Continued)

OTHER PUBLICATIONS

JP 2005001311 A Machine Translation.*
(Continued)

*Primary Examiner* — Maria Veronica Ewald
*Assistant Examiner* — Travis Figg
(74) *Attorney, Agent, or Firm* — Foley & Lardner LLP

(57) ABSTRACT

A skin-fitted foam molding member includes a core material, a skin having a roll portion, and a foam body filled between an internal surface of the core material and an internal surface of the skin. A seal portion is formed by welding an external surface of an end portion of the core material with the roll portion which faces the external surface of the end portion of the core material. The skin has a rib portion which is so formed as to protrude from the internal surface of the skin toward the core material and which faces an internal surface of the end portion of the core material, where the rib portion forms an inward seal portion by sandwiching the end portion of the core material between the roll portion and the rib portion by a foaming pressure of the foam.

4 Claims, 7 Drawing Sheets

(51) Int. Cl.
  *B29C 44/14* (2006.01)
  *B32B 5/18* (2006.01)
  *B32B 7/04* (2006.01)

(56) References Cited

FOREIGN PATENT DOCUMENTS

| CN | 1833941 A | 9/2006 |
| JP | 54-134772 A | 10/1979 |
| JP | 03-158212 A | 7/1991 |
| JP | 08-025374 A | 1/1996 |
| JP | 11-151728 A | 6/1999 |
| JP | 2914686 B2 | 7/1999 |
| JP | 2001-145926 A | 5/2001 |
| JP | 2003-220854 A | 8/2003 |
| JP | 2005-001311 A | 1/2005 |
| JP | 2005001311 A * | 1/2005 |
| JP | 2006-123601 A | 5/2006 |
| WO | WO 2006/010321 A1 | 2/2006 |

OTHER PUBLICATIONS

Definition of Vicinity.*
Japanese Office Action and English Language Translation dated May 28, 2013 (4 pages).

* cited by examiner (A)

(B)

(A)

(B)

(A)

(B)

(A)

(B)

PRODUCTION APPARATUS OF SKIN-FITTED FOAM MOLDING MEMBER, PRODUCTION METHOD OF SKIN-FITTED FOAM MOLDING MEMBER, AND SKIN-FITTED FOAM MOLDING MEMBER

CROSS-REFERENCE TO RELATED APPLICATIONS

This application is a divisional of Ser. No. 13/132,445 filed on Jun. 2, 2011, which is a national stage application of International Application No. PCT/JP2009/067997 filed on Oct. 19, 2009, which is based upon and claims the benefit of priority from Japanese Patent Application No. 2008-309028 filed on Dec. 3, 2008, the entire contents of all are incorporated herein by reference.

TECHNICAL FIELD

The present invention relates to a production apparatus of a skin-fitted foam molding member, a production method of the skin-fitted foam molding member, and the skin-fitted foam molding member.

BACKGROUND ART

With respect to internal components used for vehicles, at home and the like, skin-fitted foam molding members having three layer structure including skin layer—foam body layer—core material layer are used in many occasions. The skin-fitted foam molding member constitutes a molded article by filling a foam body between a core material and a skin which are disposed in a forming mold and then integrating them. For preventing the foam body from leaking from between the skin and the core material in the production of the skin-fitted foam molding member (refer to Patent Literature 1), a seal portion is formed.

CITATION LIST

Patent Literature

Patent Literature 1: Japanese Patent Application Laid-Open No 2001-145926

SUMMARY OF INVENTION

Technical Problem

With respect to the seal portion of the Patent Literature 1, an end face of an end portion of the core material is exposed to the outside of a molded article. In the case of such seal portion, an external view quality as a molded article is degraded unless the seal portion is disposed in a hidden position which is not visible from a user who uses the molded article. Thus, restriction of the position for forming the seal portion, as the case may be, limits freedom of the shape as a molded article.

The present invention relates to a production technology of a skin-fitted foam molding member having a 3-layer structure including a core material, a skin and a foam body. It is an object of the present invention to provide a production apparatus and a production method of the skin-fitted foam molding member provided with a seal portion which does not degrade an external view quality. Moreover, it is another object of the present invention to provide the skin-fitted foam molding member provided with the seal portion which does not degrade the external view quality.

Solution to Problem

The present invention relates to a production apparatus of a skin-fitted foam molding member, including: a first mold having a mold face, an external surface of a core material being so disposed as to face the mold face of the first mold; a second mold having a mold face and so disposed as to open and close relative to the first mold, an external surface of a skin which has a roll portion bendably formed being so disposed as to face the mold face of the second mold; a bender for bending, in a state that the first mold and the second mold are closed, the roll portion to allow the roll portion to face an external surface of an end portion of the core material; a welder for forming a seal portion which prevents a leak of a foam body filled between an internal surface of the core material and an internal surface of the skin, the preventing operation of the leak of the foam body being implemented by welding the end portion of the core material with the roll portion; and a filler for filling the foam body to between the internal surface of the core material and the internal surface of the skin, wherein the skin has a rib portion which is so formed as to protrude from the internal surface of the skin toward the core material and which faces an internal surface of the end portion of the core material, and the rib portion forms an inward seal portion by sandwiching the end portion of the core material between the roll portion and the rib portion by dint of a foaming pressure of the foam body.

Moreover, the present invention relates to a method of producing a skin-fitted foam molding member, the method including: disposing, in a state that a first mold and a second mold which open and close relative to each other are opened, an external surface of a core material such that the external surface of the core material faces a mold face of the first mold; disposing an external surface of a skin having a roll portion bendably formed such that the external surface of the skin faces a mold face of the second mold; closing the first mold and the second mold; bending the roll portion such that the roll portion faces an external surface of an end portion of the core material; forming a seal portion which prevents a leak of a foam body filled between an internal surface of the core material and an internal surface of the skin, the preventing operation of the leak of the foam body being implemented by welding the end portion of the core material with the roll portion; and filling the foam body to between the internal surface of the core material and the internal surface of the skin, wherein the method further comprising: disposing, when the first mold and the second mold are closed, a rib portion so formed as to protrude from the internal surface of the skin toward the core material such that the rib portion faces an internal surface of the end portion of the core material, and forming an inward seal portion by sandwiching the end portion of the core material between the rib portion and the roll portion by dint of a foaming pressure of the foam body.

Moreover, the present invention relates to a skin-fitted foam molding member including: a core material; a skin having a roll portion; a foam body filled between an internal surface of the core material and an internal surface of the skin; and a seal portion which prevents a leak of the foam body, wherein the seal portion is formed by welding an external surface of an end portion of the core material with the roll portion which is so bent as to face the external surface of the end portion of the core material, and the skin has a rib portion which is so formed as to protrude from the internal surface of the skin toward the core material and which faces an internal surface of the end portion of the core material, where the rib portion forms an inward seal portion by sandwiching the end portion of the core material between the roll portion and the rib portion by dint of a foaming pressure of the foam body.

Advantageous Effects of Invention

With the production apparatus and production method of the skin-fitted foam molding member of the present invention, forming the welding seal portion by welding the end portion of the core material with the skin's roll portion which faces the external surface of the end portion of the core material can form a seal portion which does not degrade the external view quality of the skin-fitted foam molding member, and the skin-fitted foam molding member provided with the seal portion which does not degrade the external view quality can be provided.

Moreover, with the production apparatus and production method of the skin-fitted foam molding member of the present invention, the roll portion of the skin is fixed to the external surface of the core material, to thereby improve the external view quality. Moreover, the double seal structure of the rib portion and roll portion can improve sealability against leak of the foam body.

DESCRIPTION OF EMBODIMENTS

Embodiments

Hereinafter, an embodiment of the present invention is to be set forth referring to drawings.

Figure 1:
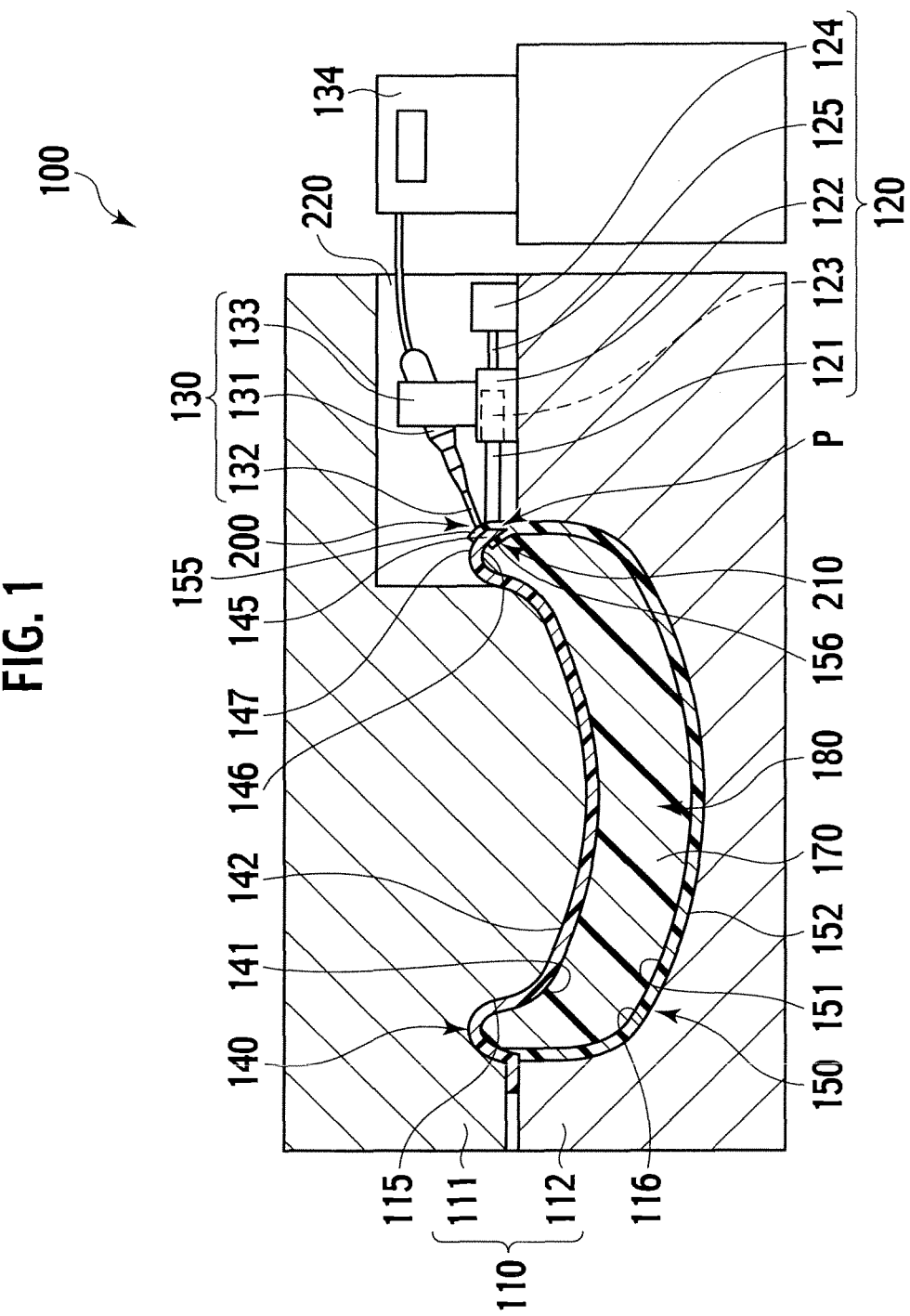
FIG. 1 is a cross sectional view for simply showing a production apparatus of a skin-fitted foam molding member, according to an embodiment of the present invention.
Figure 2:
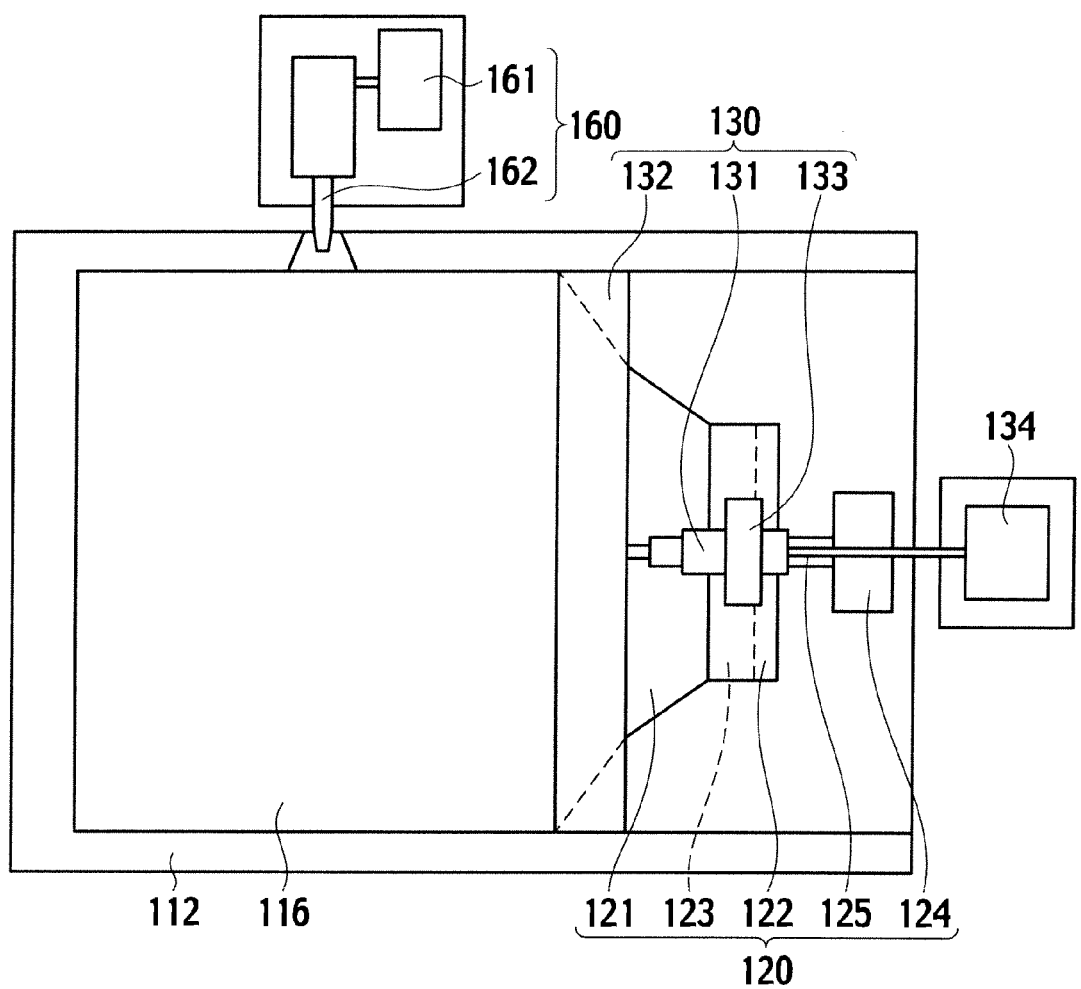
FIG. 2 is a plan view showing a structure of the production apparatus together with a first mold.
Figure 5:
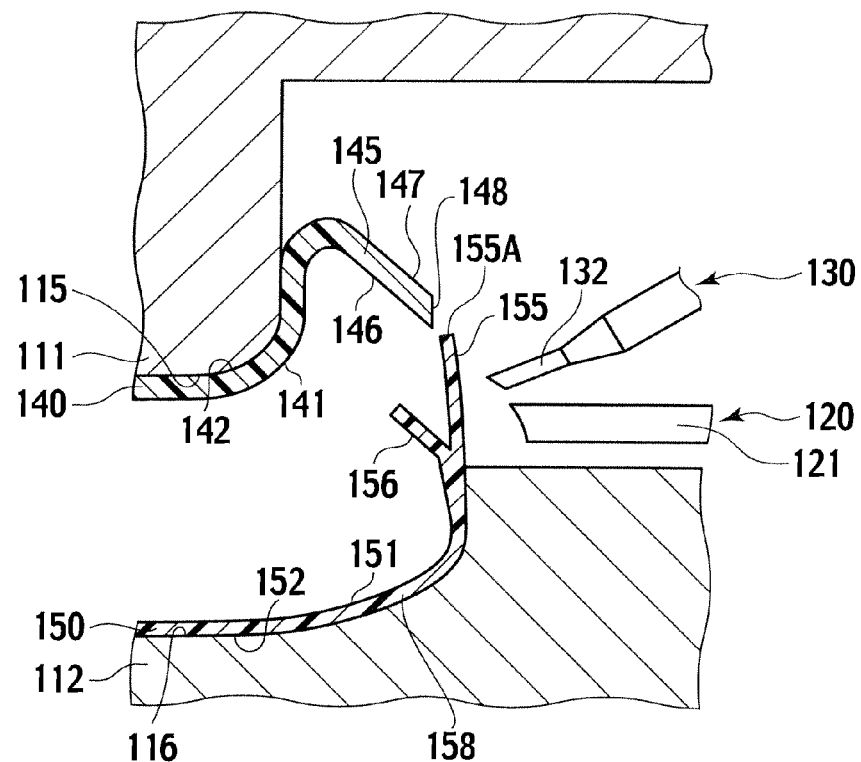
FIG. 5(A) and FIG. 5(B) are cross sectional views (with a seal portion shown enlarged) for explaining a method of producing a skin-fitted foam molding member, according to the embodiment.
Figure 5:
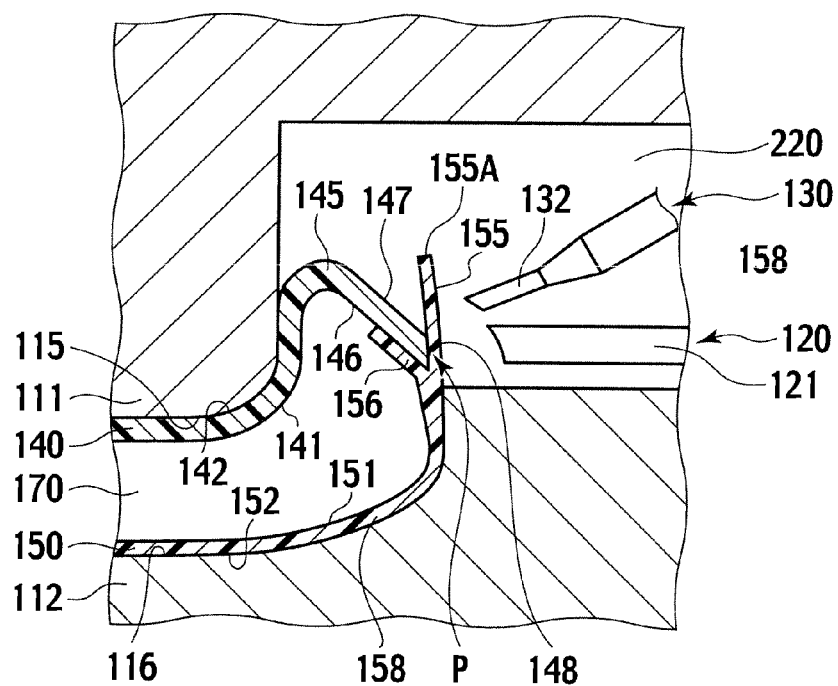
Figure 6:
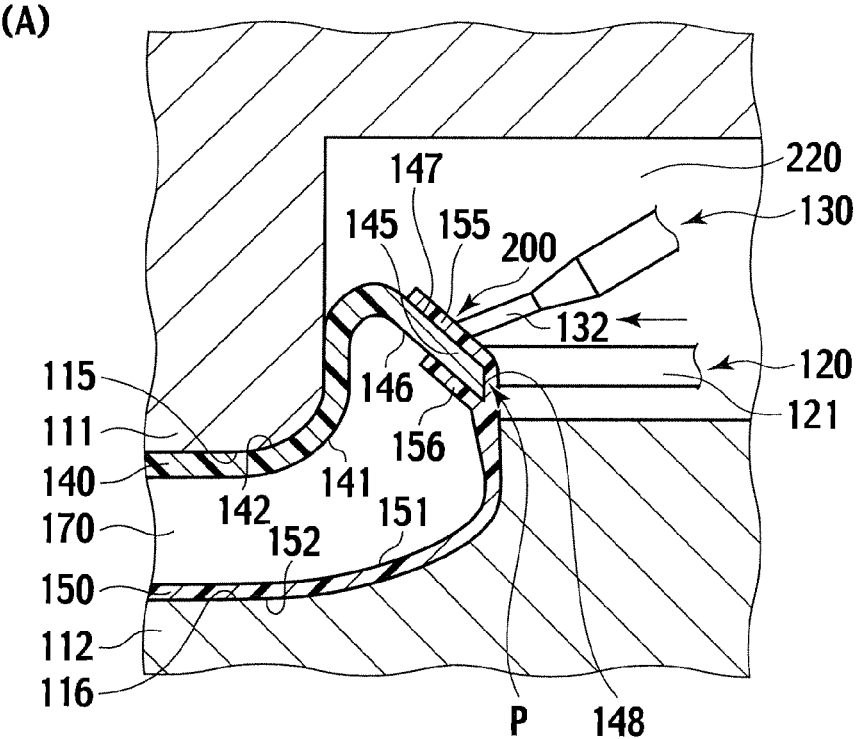
FIG. 6(A) and FIG. 6(B) are cross sectional views (with the seal portion shown enlarged) for explaining the method of producing a skin-fitted foam molding member, according to the embodiment.
Figure 6:
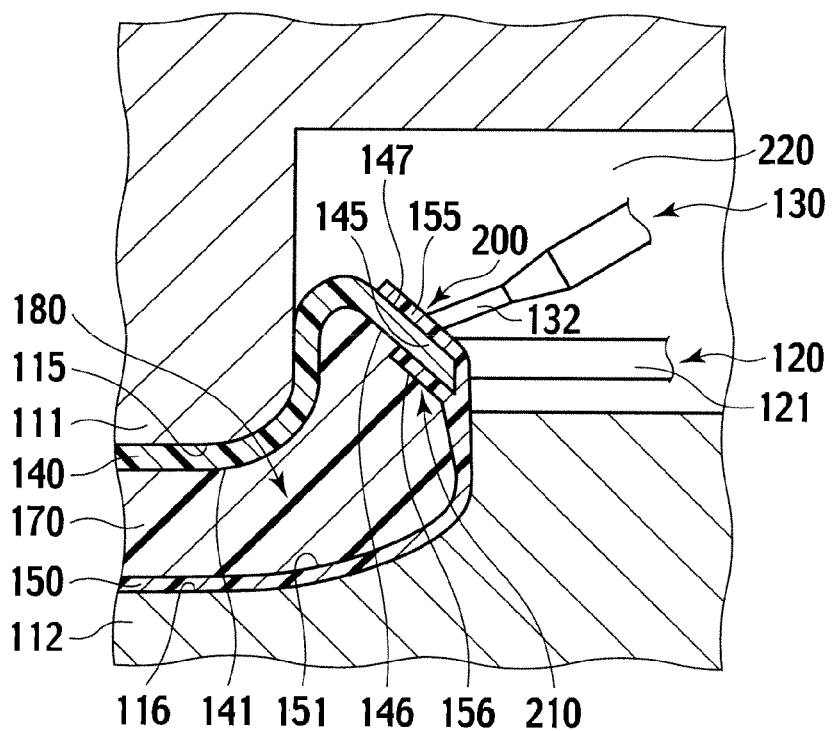
Figure 7:
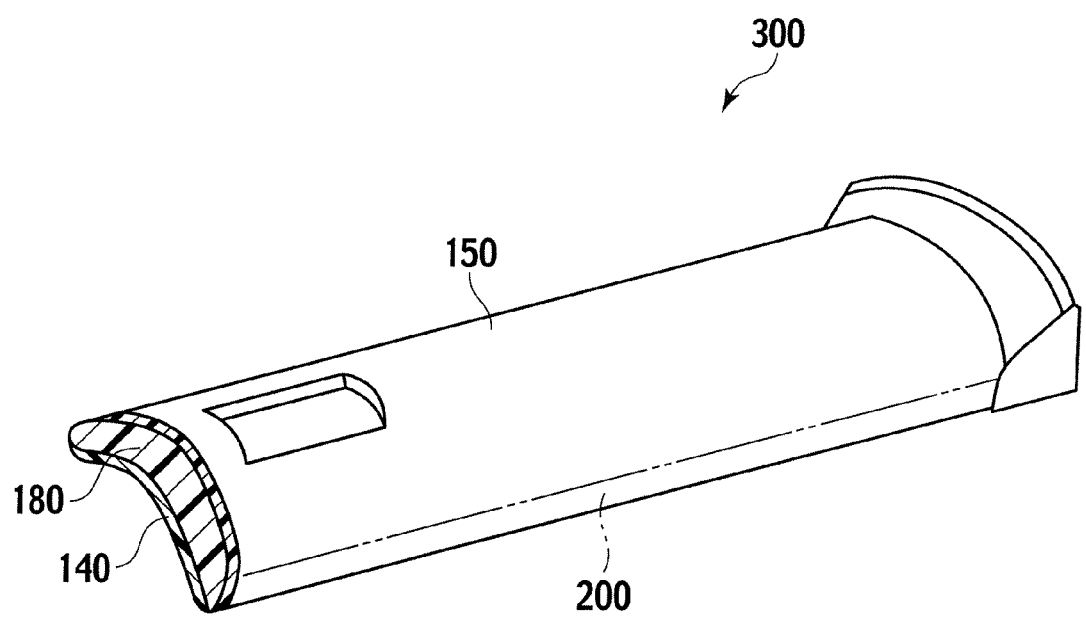
FIG. 7 is an external view of the skin-fitted foam molding member.

FIG. 1 is a cross sectional view simply showing a production apparatus 100 of a skin-fitted foam molding member according to the embodiment of the present invention, FIG. 2 is a plan view showing the structure of the production apparatus 100 together with a lower mold 112, FIG. 3(A), FIG. 3(B), FIG. 4(A) and FIG. 4(B) are cross sectional views for explaining a method of molding a skin 150, FIG. 5(A), FIG. 5(B), FIG. 6(A) and FIG. 6(B) are cross sectional views (with a welding seal portion 200 shown enlarged) for explaining a method of producing a skin-fitted foam molding member 300 according to the embodiment, and FIG. 7 is an external view of the skin-fitted foam molding member 300.

Structure

Referring to FIG. 1 and FIG. 2, the structure of the production apparatus 100 of the skin-fitted foam molding member 300 (refer to after-described FIG. 7) is to be set forth.

To give an outline, a production apparatus of a skin-fitted foam molding member, includes: an upper mold (corresponding to a first mold) having a mold face, an external surface of a core material being so disposed as to face the mold face of the upper mold; a lower mold (corresponding to a second mold) having a mold face and so disposed as to open and close relative to the upper mold, an external surface of a skin having a roll portion bendably formed being so disposed as to face the mold face of the lower mold; a bender for bending, in a state that the upper mold and the lower mold are closed, the roll portion to allow the roll portion to face an external surface of an end portion of the core material; a welder for forming a welding seal portion (corresponding to a seal portion) which prevents a leak of a foam body filled between an internal surface of the core material and an internal surface of the skin, the preventing operation of the leak of the foam body being implemented by welding the end portion of the core material with the roll portion; and a filler for filling the foam body to between the internal surface of the core material and the internal surface of the skin, wherein the skin has a rib portion which is so formed as to protrude from the internal surface of the skin toward the core material and which faces an internal surface of the end portion of the core material, and the rib portion forms an inward seal portion by sandwiching the end portion of the core material between the roll portion and the rib portion by dint of a foaming pressure of the foam body.

According to the embodiment, the production apparatus 100 of the skin-fitted foam molding member of the present invention is applied to an injection molder which implements molding by injecting a foam body 180 to between a core material 140 and a skin 150 which are disposed in a forming mold 110. As the skin-fitted foam molding member 300, a vehicular internal component having a 3-layer structure of skin 150—foam body 180—core material 140 is molded (refer to FIG. 7). Hereinafter, the embodiment is to be set forth in detail.

Referring to FIG. 1 and FIG. 2, the production apparatus 100 of the skin-fitted foam molding member has the forming mold 110 including an upper mold 111 and a lower mold 112. The upper mold 111 has a mold face 115 which conforms to the shape of an external surface 142 of the core material 140, while the lower mold 112 has a mold face 116 which conforms to the shape of an external surface 152 of the skin 150. Between an internal surface 141 of the core material 140 and an internal surface 151 of the skin 150, a filling space 170 for filling a foam body 180 is formed by closing the upper mold 111 and the lower mold 112.

A receiver space 220 for receiving a welder 130 and a bender 120 is formed between the upper mold 111 and the lower mold 112. Integrating the welder 130 with the bender 120 by connecting the two members 130, 120 and disposing the welder 130 and the bender 120 in the receiver space 220 miniaturize the production apparatus 100. In FIG. 1 and FIG. 2, the welder 130 and the bender 120 are disposed on the lower mold 112 in the receiver space 220.

The skin 150 has a rib portion 156 so formed as to protrude from the internal surface 151 toward the core material 140. The rib portion 156 is so disposed as to face an internal surface 146 of an end portion 145 of the core material 140. Between the rib portion 156 and a roll portion 155, the end portion 145 of the core material 140 is sandwiched by dint of a foaming pressure of the foam body 180, to thereby allow the rib portion 156 to form an inward seal portion 210 {refer to FIG. 6(B)}. The inward seal portion 210 prevents the foam body 180 from leaking out of the inside of the filling space 170.

Through the injection molding, the roll portion 155 and the rib portion 156 are formed in advance at the skin 150 {refer to FIG. 3(A), FIG. 3(B), FIG. 4(A) and FIG. 4(B)}. In the examples in the above drawings, the roll portion 155 and the rib portion 156 are formed at the skin 150's end portion on a side for forming the welding seal portion 200.

A position P at which the end portion 145 of the core material 140 abuts on the skin 150 is defined as a base point. At the position P, the roll portion 155 of the skin 150 is bent. An end face 148 of the end portion 145 of the core material 140 is formed in a shape conforming to the shape of the internal surface 151 of the skin 150. This is for preventing the skin 150 from being uplifted at the position P as the bending base point, and thereby improving sealability {refer to FIG. 6(A)}.

Referring to FIG. 2, the bender 120 has a support portion 121 for supporting the roll portion 155 and a driving portion 124 for moving the support portion 121 forward and backward relative to an external surface 147. The bender 120 further has a slide base 122 which is so formed as to move forward and backward relative to the forming mold 110. The slide base 122 connects the support portion 121 with the driving portion 124.

The driving portion 124 reciprocates a rod 125 to thereby move the slide base 122 forward and backward. According to the forward-backward movement of the slide base 122, the support portion 121 and the welder 130 which is coupled with the slide base 122 move forward and backward relative to the external surface 147. One driving portion 124 can move the bender 120 and welder 130 forward and backward, so that the facility investment cost can be reduced. In FIG. 2, an ordinary fluid pressure cylinder fitted with a reciprocating mechanism is used for the driving portion 124.

According to the forward movement of the slide base 122, the support portion 121 pushes the roll portion 155 to the external surface 147. This pushing operation bends the roll portion 155 with the position P (on which the end portion 145 of the core material 140 abuts) as a base point. The thus bent roll portion 155 is bought into such a state as to abut on and face the external surface 147 {refer to FIG. 6(A)}.

The slide base 122 is provided with a snap portion 123 for preventing a pushing force from being excessively applied to the end portion 145 of the core material 140. A compressive coil is used for the snap portion 123.

The shape of the end face of the head end portion of the support portion 121 is formed into a curve shape conforming to an external shape of the end portion 145 of the core material 140. This is because forming into the curve shape can smoothen the operation of bending the roll portion 155 and can prevent the roll portion 155 from being uplifted from the external surface 147 {refer to FIG. 6(A)}.

Referring to FIG. 2, the welder 130 has an arm portion 131 mounted to a slide piece 133 connected to the slide base 122, and a horn portion 132 for welding the end portion 145 (of the core material 140) with the roll portion 155 (of the skin 150) by applying a vibration from a head end. The horn portion 132 is formed into a rectangle shape corresponding to the shape of the welding seal portion 200 and a welding range.

The horn portion 132 applies the vibration (caused by a vibration generator 134) to the roll portion 155 and heats the roll portion 155. The thus heated roll portion 155 melts. The thus melted roll portion 155 is cooled, to thereby welding-fix the roll portion 155 to the external surface 147 by welding {refer to FIG. 6(A)}.

A filler 160 is provided with a holding portion 161 for holding the foam body 180 and a nozzle portion 162 for filling the foam body 180 in the filling space 170. Through a gate portion formed at the lower mold 112, the filler 160 injects the foam body 180 into the filling space 170. An ordinary injector for injecting a mold material is used for the filler 160.

Molding Method

Next, a method of molding the skin 150 having the roll portion 155 and the rib portion 156 is to be set forth.

Figure 3:
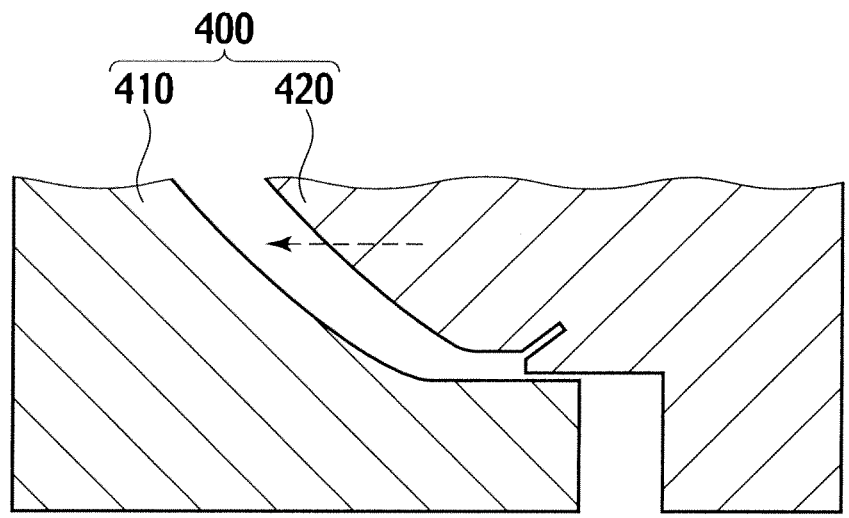
FIG. 3(A) and FIG. 3(B) are cross sectional views for explaining a method of molding a skin.
Figure 3:
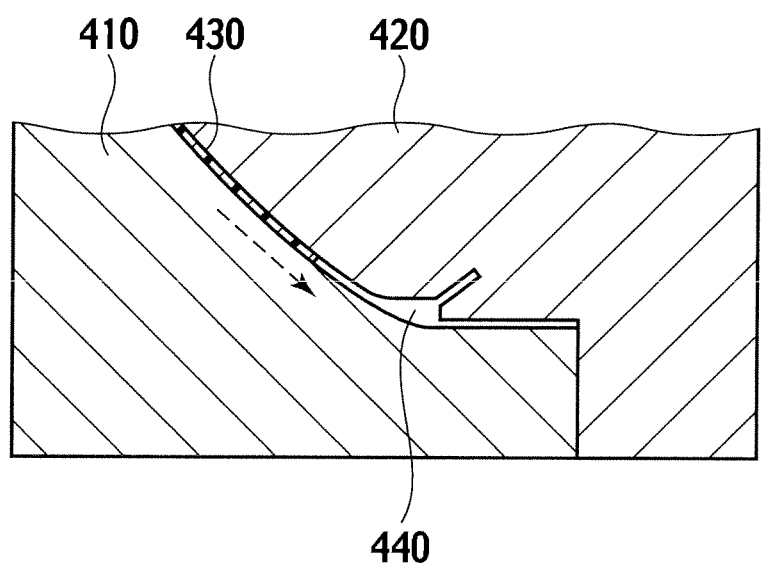

Referring to FIG. 3(A), a special forming mold 400 for molding the skin 150 has a cavity mold 410 and a core mold 420. At first, the cavity mold 410 and the core mold 420 are closed.

Referring to FIG. 3(B), closing the core mold 420 forms a cavity 440 (shaped along the shapes of the roll portion 155 and the rib portion 156) in the special forming mold 400. A melted resin material 430 is flowed into the cavity 440.

Figure 4:
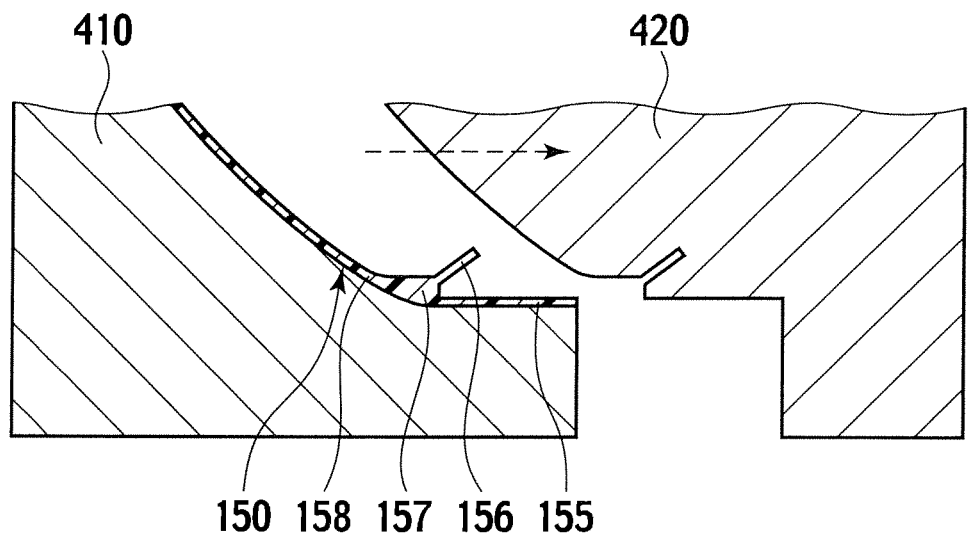
FIG. 4(A) and FIG. 4(B) are cross sectional views for explaining a method of molding the skin.
Figure 4:
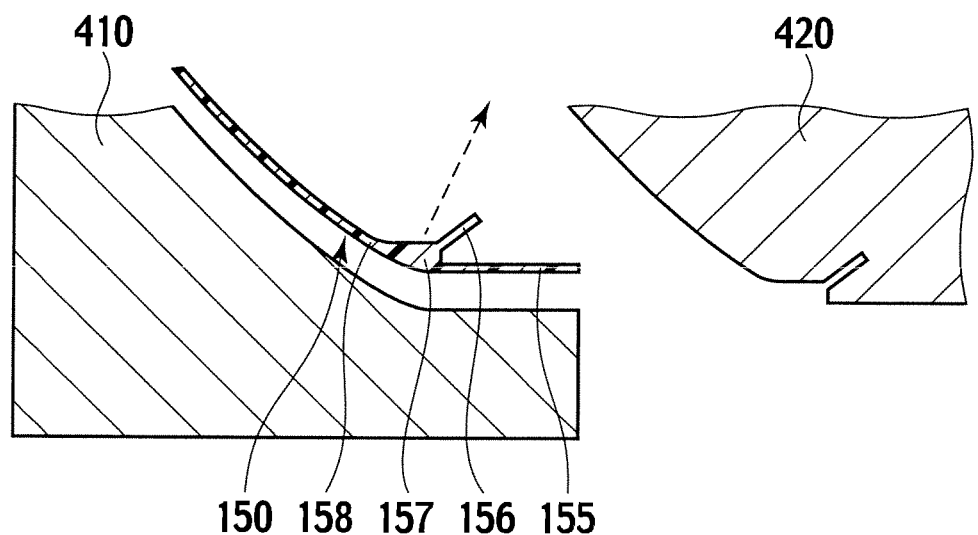

Referring to FIG. 4(A), after the resin material 430 is cooled, the special forming mold 400 is opened.

Referring to FIG. 4(B), the skin 150 is taken out. Use of the special forming mold 400 can form the skin 150 which has a body portion 158, and the roll portion 155 and the rib portion 156 which are each formed to be branching from the body portion 158. The roll portion 155 and the rib portion 156 are formed bendably with a bending portion 157 as a base point. As set forth above, welding-fixing the roll portion 155 to the end portion 145 of the core material 140 forms the welding seal portion 200. Sandwiching the end portion 145 of the core material 140 between the rib portion 156 and the roll portion 155 allows the rib portion 156 to form the inward seal portion 210 {refer to FIG. 6(B)}. Use of the special forming mold 400 can form the body portion 158 having a thickness, for example, about 1 mm.

Production Method

Next, a method of producing the skin-fitted foam molding member 300 is to be set forth.

Process of Disposing Core Material 140

Referring to FIG. 5(A), as a state of the forming mold 110 opened, the external surface 142 of the core material 140 is so disposed as to face the mold face 115 of the upper mold 111.

Process of Disposing Skin 150

Meanwhile, the external surface 152 of the skin 150 is so disposed as to face the mold face 116 of the lower mold 112.

While the roll portion 155 and the rib portion 156 are prevented from falling toward the mold face 116 side, the roll portion 155 is so disposed as to rise from the lower mold 112 toward the upper mold 111. The rib portion 156 is inclined relative to the roll portion 155 and is so disposed as to face the internal surface 141 of the core material 140.

Process of Closing Forming Mold 110

Referring to FIG. 5(B), the upper mold 111 and lower mold 112 are closed, to thereby form the filling space 170 for filling the foam body 180 between the internal surface 141 of the core material 140 and the internal surface 151 of the skin 150.

When the forming mold 110 is to be closed, the rib portion 156 is so disposed as to face the internal surface 146. This is for forming the inward seal portion 210 by sandwiching the end portion 145 of the core material 140 between the rib portion 156 and the roll portion 155 by dint of the foaming pressure of the foam body 180 {refer to FIG. 6(B)}.

Since the end face 148 is formed in a shape conforming to the shape of the internal surface 151 of the skin 150, the skin 150 can be prevented from being uplifted at the position P as the bending base point. The welder 130 and the bender 120 are received and disposed in the receiver space 220 formed between the upper mold 111 and the lower mold 112.

Process of Bending Roll Portion 155

Referring to FIG. 6(A), the roll portion 155 is bent to allow the roll portion 155 to face the external surface 147.

Referring to FIG. 2, the driving portion 124 moves the slide piece 133 forward via the rod 125. According to the forward movement of the slide piece 133, the support portion 121 moves forward. The support portion 121 pushes the roll portion 155 to the external surface 147. With the position P on which the end portion 145 of the core material 140 abuts as a base point, the above pushing operation bends the roll portion 155.

The thus bent roll portion 155 faces to and abuts on the external surface 147. The simple forward movement of the support portion 121 can bend the roll portion 155 to simplify the bending operation of the roll portion 155.

In conjunction with the movement of the support portion 121, the welder 130 moves toward the end portion 145 of the core material 140. The horn portion 132 of the welder 130 is disposed around the position where the end portion 145 of the core material 140 abuts on the roll portion 155.

Welding Process

Welding the end portion 145 of the core material 140 with the roll portion 155 which is disposed to face the external surface 147 forms the welding seal portion 200.

The welder 130 heats the roll portion 155, to thereby weld and fix the roll portion 155 to the external surface 147. The thus welded and fixed portion functions as the welding seal portion 200.

Covering the end face 148 with the roll portion 155 can form the welding seal portion 200, to thereby prevent the end face 148 from being exposed outside. Thus, the welding seal portion 200 which does not degrade an external view quality as a molded article can be formed.

Filling Process

Referring to FIG. 6(B), the foam body 180 is filled into the filling space 170 formed between the internal surface 141 of the core material 140 and the internal surface 151 of the skin 150.

The foam body 180 is foamed in the filling space 170, and gradually fills the filling space 170.

The welding seal portion 200 prevents the foam body 180 from leaking from the outside of the filling space 170. Meanwhile, the rib portion 156 forms the inward seal portion 210 by sandwiching the end portion 145 of the core material 140 between the roll portion 155 and the rib portion 156 by dint of the foaming pressure of the foam body 180.

The inward seal portion 210 prevents the foam body 180 from leaking out of the inside of the filling space 170. Therefore, leak of the foam body 180 from the filling space 170 can be further prevented.

The driving portion 124 (FIG. 2) moves the bender 120 and the welder 130 backward and then opens the forming mold 110, to thereby take out the skin-fitted foam molding member 300 which is an integration of the core material 140, the skin 150 and the foam body 180. The skin-fitted foam molding member 300 in which the welding seal portion 200 and the inward seal portion 210 prevent the foam body 180 from leaking and the external view quality as a molded article is prevented from being degraded can be formed.

In the process of the production operation of the skin-fitted foam molding member 300, the roll portion 155 formed at the skin 150 in advance is welded-fixed to the end portion 145 of the core material 140, to thereby form the welding seal portion 200.

Use of the bender 130 and the welder 120 can form the welding seal portion 200 through a simple operation of welding-fixing the roll portion 155 by bending the roll portion 155. It is not necessary to perform the operation of forming the welding seal portion 200 separately from the operation of producing the skin-fitted foam molding member 300, thus lowering of the efficiency of the production operation of the skin-fitted foam molding member 300 can be prevented.

Referring to FIG. 7, the thus molded skin-fitted foam molding member 300 is applicable to automobile internal components. The skin-fitted foam molding member 300 in FIG. 7 is a structural member of a glove compartment installed in the vehicle. The welding seal portion 200 prevents the end face 148 from being exposed outside, thus preventing degrading of the glove compartment's design as a product.

Herein, characteristics of the skin-fitted foam molding member 300 as a product are to be set forth.

Referring to FIG. 4(A), FIG. 4(B), FIG. 5(A), FIG. 5(B), FIG. 6(A) and FIG. 6(B), the roll portion 155 is longer than the rib portion 156. The longer the roll portion 155 is, the more easily the roll portion 155 is bent, thus making it easier to weld the roll portion 155 to the core material 140. Meanwhile, in an operation of combining the core material 140 with the skin 150, the shorter the rib portion 156 is, the more easily the rib portion 156 is prevented from being caught by the core material 140. The roll portion 155 which is made longer than the rib portion 156 can satisfy the above two.

Referring to FIG. 5(A), FIG. 5(B), FIG. 6(A) and FIG. 6(B), the internal surface 141 of the end face 148 of the end portion 145 of the core material 140 has a protruding slope face. In an operation of combining the core material 140 with the skin 150, the protruding slop face works to more smoothly insert the core material 140 between the roll portion 155 of the skin 150 and the rib portion 156 of the skin 150.

Referring to FIG. 5(A), FIG. 5(B), FIG. 6(A) and FIG. 6(B), the welding seal portion 200 is disposed adjacent to a tip end 155A of the roll portion 155. That is, maximizing the length from the bending base point P of the roll portion 155 to the welding seal portion 200 can implement an efficient welding with a shorter welding allowance. Moreover, when the skin-fitted foam molding member 300 is applied to a door of the glove compartment, the welding seal portion 200 can be disposed in a place which is less visible.

As set forth above, with respect to the production apparatus 100 of the skin-fitted foam molding member according to the embodiment, welding the core material 140 with the skin 150's roll portion 155 which faces the external surface 147 of the end portion 145 of the core material 140 can form the welding seal portion 200. Covering the end face 148 of the end portion 145 of the core material 140 with the roll portion 155 can form the welding seal portion 200, to thereby prevent the end face 148 from being exposed outside. Thus, the welding seal portion 200 which does not degrade the external view quality as a molded article can be formed.

Sandwiching the end portion 145 between the rib portion 156 and the roll portion 155 by dint of the foaming pressure of the foam body 180 can form the inward seal portion 210. This can further prevent the leak of the foam body 180 out of the filling space 170.

Operating the driving portion 124 moves the support portion 121 forward and backward. The simple forward movement of the support portion 121 can bend the roll portion 155 such that the roll portion 155 faces the external surface 147. Thus, the operation of bending the roll portion 155 can be simplified.

The end face 148 of the end portion 145 of the core material 140 is formed in a shape conforming to the shape of the internal surface 151 of the skin 150, thus the skin 150 can be prevented from being uplifted at the position P as a bending base point.

The receiver space 220 for receiving the welder 130 and the bender 120 is formed between the upper mold 111 and the lower mold 112. Thus, the production apparatus 100 can be miniaturized.

The skin-fitted foam molding member 300 can be provided which has the welding seal portion 200 formed by welding the external surface 147 with the roll portion 155 which is so bend as to face the external surface 147. The welding seal portion 200 prevents a leak of the foam body 180 and thereby forming of the welding seal portion 200 can prevent a degradation of the external view quality as a molded article.

The present invention is not limited to the above embodiment and can be properly modified.

According to the embodiment, the welding seal portion 200 and the inward seal portion 210 are formed, however, the leak of the foam body 180 may be prevented only by the welding seal portion 200.

The structure of the production apparatus 100 is not limited to that disclosed in the embodiment, otherwise, for example, disposing a plurality of welders 130, disposing a plurality of benders 120 and disposing the welder 130 and the bender 120 in the upper mold 111 are allowed.

A known welder capable of welding the core material 140 with the skin 150 such as a vibration welder and an ultrasonic welder may be properly selected for the welder 130.

The shapes of the rib portion 156 and the roll portion 155 of the skin 150, and the shape of the end portion 145 of the core material 140 are not limited to those shown in the drawings, and can be properly changed according to the shape of a molded face or the shape of a molded article.

The method of forming the skin 150 is not limited to the injection molding method using the special forming mold 400, and another molding method capable of forming the rib portion 156 and the roll portion 155 at the skin 150 can be adopted.

The position for forming the welding seal portion 200 is not limited to the portion denoted in the skin-fitted foam molding member 300 according to the embodiment. Moreover, the welding seal portions 200 can be formed in a plurality of portions in one skin-fitted foam molding member 300.

The skin-fitted foam molding member 300 is applicable to articles other than the automobile internal components shown in the embodiment. For example, the skin-fitted foam molding member 300 is applicable to internal components such as home commodities which require preventing degrading of a design as a product.

The production apparatus 100 and production method of the skin-fitted foam molding member according to the embodiment are not used only to the injection molding and can be widely applied to a molding method and a molding apparatus which have such an object as to provide the skin-fitted foam molding member 300 formed by filling the foam body 180 in the space formed between the core material 140 and the skin 150 in a state in which the forming mold 110 is closed and then integrating the core material 140, the skin 150 and the foam body 180.

The entire contents of the Japanese Patent Application No. 2008-309028 (filed on Dec. 3, 2008) are incorporated herein by reference, in order to take protection against erroneous translations or omitted portions.

The contents of the prevent invention have been set forth according to the embodiment, however, the present invention is not limited to the above descriptions. It is obvious to a person skilled in the art that various modifications and improvements are allowed.

INDUSTRIAL APPLICABILITY

With the production apparatus and the production method of the skin-fitted foam molding member of the present invention, welding the end portion of the core material with the skin's roll portion which faces the external surface of the end portion of the core material to thereby form the seal portion can form the seal portion which does not degrade an external view quality of the skin-fitted foam molding member. Moreover, the skin-fitted foam molding member provided with the seal portion which does not degrade an external view quality can be provided.

Moreover, with the production apparatus and the production method of the skin-fitted foam molding member of the present invention, the roll portion of the skin is fixed to the external surface of the core material, to thereby improve the external view quality. Moreover, the double seal structure of the rib portion and the roll portion can improve sealability against a leak of the foam body.

The invention claimed is:
1. A skin-fitted foam molding member, comprising:
a core material;
a skin having a roll portion;
a foam body filled between an internal surface of the core material and an internal surface of the skin; and
a seal portion which prevents a leak of the foam body,
wherein the seal portion is formed by welding an external surface of an end portion of the core material with the roll portion which is so bent as to face the external surface of the end portion of the core material,
wherein the skin has a rib portion which is so formed as to protrude from the internal surface of the skin toward the core material and which faces an internal surface of the end portion of the core material, where the rib portion forms an inward seal portion by sandwiching the end portion of the core material between the roll portion and the rib portion by a foaming pressure of the foam body, wherein the seal portion is formed by an end face of the end portion of the core material covered with the roll portion on the external surface of the end portion of the core material, wherein the roll portion is longer than the rib portion, and wherein the roll portion has a fixed portion fixed to the external surface of the end portion of the core material.

2. The skin-fitted foam molding member according to claim 1, wherein an internal surface of the end face of the end portion of the core material has a protruding slope face.

3. The skin-fitted foam molding member according to claim 2, wherein the end face of the end portion of the core material has a shape conforming to the internal surface of the skin.

4. The skin-fitted foam molding member according to claim 1, wherein the seal portion is disposed in a vicinity of a tip end of the roll portion.

* * * * *